UNITED STATES PATENT OFFICE.

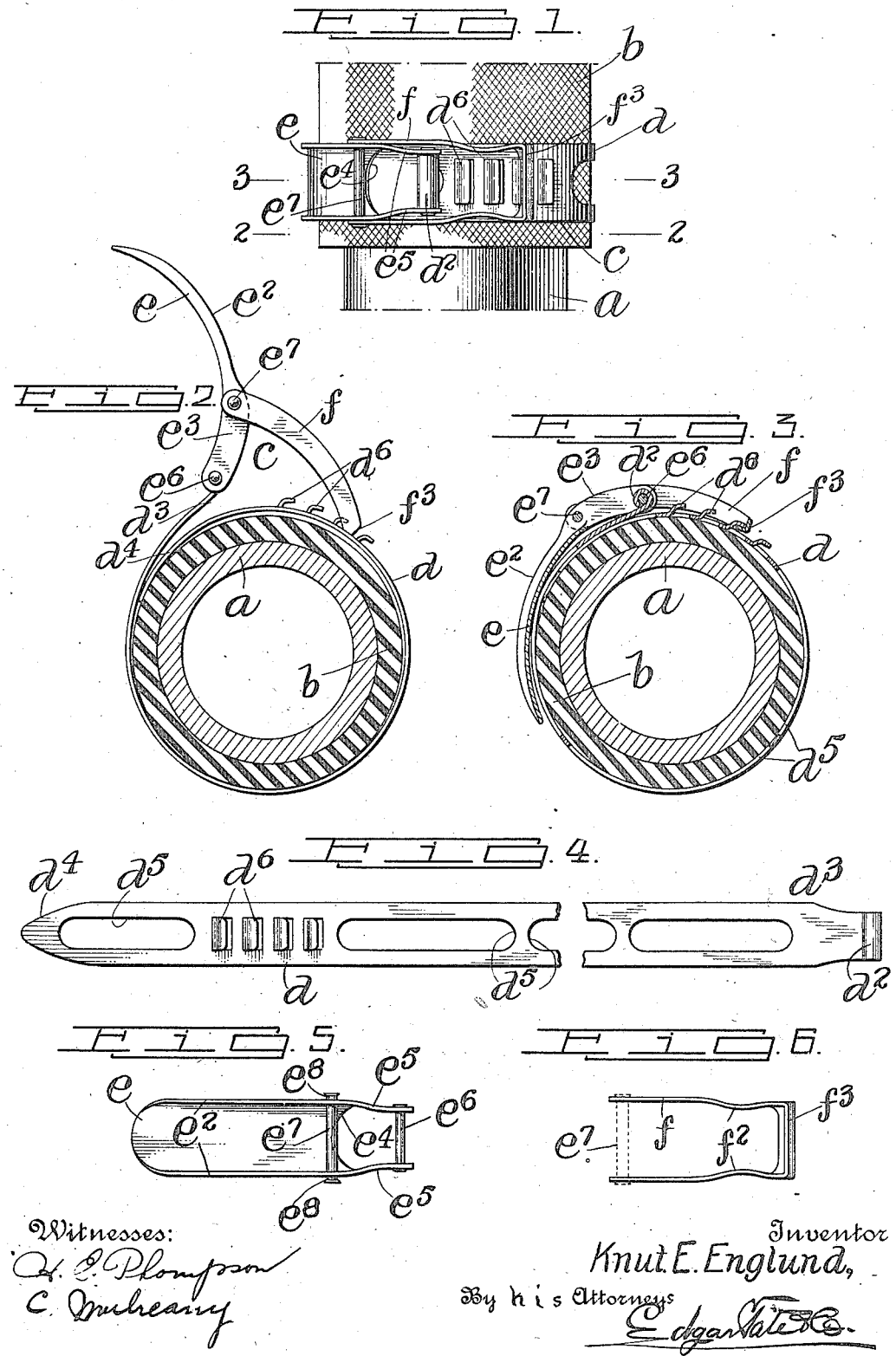

KNUT E. ENGLUND, OF BROOKLYN, NEW YORK.

HOSE-CLAMP.

1,183,285.  Specification of Letters Patent.  Patented May 16, 1916.

Application filed May 6, 1915. Serial No. 26,238.

*To all whom it may concern:*

Be it known that I, KNUT E. ENGLUND, a citizen of the United States, and residing at Brooklyn, in the county of Kings and State of New York, have invented certain new and useful Improvements in Hose-Clamps, of which the following is a specification, such as will enable those skilled in the art to which it appertains to make and use the same.

This invention relates to clamps of the class used in connecting a hose to a pipe, coupling, nozzle or similar device, and the object thereof is to provide an improved clamp of this class which is simple in construction, efficient in operation and which can be quickly and easily manipulated, and which is automatically locked when applied for the purpose set out.

The invention is fully disclosed in the following specification, of which the accompanying drawing forms a part, in which the separate parts of my improvement are designated by suitable reference characters in each of the views, and in which:—

Figure 1 is a side view showing my improved clamp device in use; Fig. 2 a section on the line 2—2 of Fig. 1 and showing the method of applying the same; Fig. 3 a section on the line 3—3 of Fig. 1 and showing the clamp in a locked or operative position; Fig. 4 a plan or side view of a spring metal band which I employ; and, Figs. 5 and 6 similar views of a lever arm and a link lock device forming part of my improved clamp.

In the drawing forming part of this specification, I have shown at $a$ a metal pipe and at $b$ a hose connected therewith and, in the practice of my invention, I provide a clamp device $c$ composed of three separate parts consisting of a spring metal band $d$, a lever arm $e$ and a link lock device $f$. The lever arm $e$ is formed on the arc of a circle and stamped from sheet metal and is provided with side flanges $e^2$ which are wider at the head end $e^3$ thereof than at the other end, as clearly shown in Fig. 1, and said lever arm is cut out at the head end portion thereof, as shown at $e^4$ in Figs. 1 and 5 to form parallel and supplemental side arms $e^5$ which are curved inwardly slightly, as shown in Figs. 1 and 5, and on the outer end of the head portion of said lever arm is a transverse pin $e^6$ inwardly of which is another transverse pin $e^7$, the ends of which project slightly as shown at $e^8$, and the link lock member $f$ is pivoted on the ends $e^8$ of the pin $e^7$, as clearly shown in Figs. 1, 2 and 3. The link lock member is stamped from sheet metal and composed of spring side arms $f^2$ which are curved in the plane thereof, or made undulating in form, and said spring side arms or members are connected at one end by a cross head $f^3$ which is V-shaped in form in cross section as shown in Fig. 3.

The band $d$ is provided with a keeper $d^2$ through which the pin $e^6$ of the lever arm $e$ is passed in assembling the parts of my improved clamp and the end of said band which is connected with the lever arm $e$ is reduced in transverse dimensions, as shown at $d^3$, and the other end thereof is preferably tapered as shown at $d^4$, and said band is preferably provided with longitudinal slots or openings $d^5$ to reduce the weight thereof and add to its elasticity, and at a predetermined distance from the end $d^4$ of said lever and arranged centrally and longitudinally thereof are a plurality of lock tongues or projections $d^6$ which are cut from the material thereof, and which project in the direction of the end portion $d^3$ of said band.

The use of this device, or the method of applying the same, is substantially similar to that of other devices of this class, and in this operation the band $d$ is passed around the hose, as shown in Fig. 2, the lever arm $e$ is raised and the link lock member $f$ is connected with one of the raised lock tongues or projections $d^6$, and said lock lever is then forced down into the position shown in Figs. 1 and 3. In this operation the curved spring side arms $e^5$ and the curved spring side arm members $f^2$ of the link lock member $f$ are slightly extended and the band $d$ is drawn tightly and firmly around the hose $b$ and securely clamps it to the pipe $a$, and when the lever arm $e$ is swung fully into the closed position as shown in Figs. 1 and 3, the spring action of the parts $e^5$ and $f^2$ form a lock which prevent the opening or backward movement of the lever arm $e$ without the application thereof of considerable force, or a force equal to, or greater than that which was required in forcing said lever arm into the locking position as shown in Figs. 1 and 3. The band $d$ may be provided with any desired number of the lock tongues or projections $d^6$, and the distance between the pivot pins or points $e^6$ and $e^7$ should be approximately half the length of the clamping lock member $f$, or a little less than half the length. While my improved clamp device will operate in a way without the elastic or resilient action of the parts $e^5$ and $f^2$, as herein described, in order to secure the greatest possible efficiency and security of operation these parts must be made of spring or resilient material and be curved laterally, or in the plane thereof, as shown and described, as it is this formation of said parts which produces a positive lock of the lever arm $e$ when in its operative position.

Having fully described my invention, what I claim as new and desire to secure by Letters Patent, is:—

1. A clamp device of the class described, comprising a flexible metal band, a spring metal lever arm connected with one end of said band and formed on the arc of a circle, said lever arm being provided with side flanges and the body portion thereof being cut out at one end to form projecting side members, and a spring metal link lock member pivoted to the sides of said lever arm at a predetermined point inwardly of the connection therewith of said band, said link lock member being also stamped from sheet metal and formed on the arc of a circle and the side parts thereof being connected at one end by a cross head, and said band being provided at a predetermined distance from its free end with a plurality of hook members adapted to be engaged by said cross head, the length of said link lock member being approximately twice the distance between its connection with said arm and the connection of said arm with said band.

2. A clamp device of the class described, comprising a flexible band, a spring metal lever arm connected with one end of said band and formed on the arc of a circle, said lever arm being provided with side flanges and the body portion thereof being cut out at one end to form projecting side members, and a spring metal link lock member pivoted to the sides of said lever arm at a predetermined point inwardly of the connection therewith of said band, said link lock member being also stamped from sheet metal and formed on the arc of a circle and the side parts thereof being connected at one end by a cross head, and said band being provided at a predetermined distance from its free end with a plurality of hook members adapted to be engaged by said cross head, the projecting side members of the lever arm and the sides of the link lock member being curved laterally whereby they are made capable of longitudinal expansion and contraction.

3. A clamp device of the class described, comprising a flexible band, a spring metal lever arm loosely connected with one end of said band and formed on the arc of a circle, said lever arm being provided at one end with projecting side members, and a spring metal link lock member pivoted to the sides of said lever arm at a predetermined point inwardly of the connection therewith of said band, said link lock member being also stamped from sheet metal and formed on the arc of a circle and the side parts thereof being connected at one end by a cross head, and said band being provided at a predetermined distance from its free end with a plurality of hook members adapted to be engaged by said cross head, the sides of the link lock member being curved laterally whereby they are made capable of longitudinal expansion and contraction.

In testimony that I claim the foregoing as my invention I have signed my name in presence of the subscribing witnesses this 4th day of May 1915.

KNUT E. ENGLUND.

Witnesses:
C. MULREANY,
H. E. THOMPSON.